Sept. 20, 1955 H. B. HÅÅRD ET AL 2,718,621

MEANS FOR DETECTING AND/OR GENERATING PULSES

Filed March 11, 1953 2 Sheets-Sheet 1

INVENTORS
HANS BERTIL HÅÅRD
CARL GUNNAR SVALA
BY [signature]
ATTORNEY

Sept. 20, 1955 H. B. HÅÅRD ET AL 2,718,621

MEANS FOR DETECTING AND/OR GENERATING PULSES

Filed March 11, 1953 2 Sheets-Sheet 2

INVENTORS
HANS BERTIL HÅÅRD
CARL GUNNAR SVALA
BY [signature]
ATTORNEY

United States Patent Office 2,718,621

Patented Sept. 20, 1955

2,718,621

MEANS FOR DETECTING AND/OR GENERATING PULSES

Hans Bertil Håård, Hagersten, and Carl Gunnar Svala, Alvsjo, Sweden

Application March 11, 1953, Serial No. 341,802

Claims priority, application Sweden March 12, 1952

10 Claims. (Cl. 333—20)

The present invention refers to means for generating and/or detecting pulses, and is characterized in that it comprises a real or an artificial line connected in cascade with a low-pass filter.

Telecommunication systems are already known, in which the transmission of intelligence takes place by means of pulse trains, which are amplitude modulated by a low-frequency signal.

If the frequency components of the amplitude modulated pulse train are analyzed, a low-frequency component corresponding to the modulation, and A. C. components with frequencies which are multiples of the pulse repetition frequency, are obtained. Said A. C. components are also amplitude modulated and have thus side-bands corresponding to the low-frequency modulation.

Detection of the amplitude modulated pulse train has up to now been effected in the following manner: The low-frequency component is fed to the load and the pulse frequency and its harmonics are cut off by means of a low pass filter. A considerable part of the effect of the pulses is however lost thereby, and therefore the efficiency of the detection is low. This is a serious drawback, especially in automatic telephone systems operating with pulse transmission within the telephone exchanges (so called distributor-systems). In these systems it is endeavoured after as small an attenuation as possible in order to reduce the number of amplifiers to a minimum so as to obtain a system as simple and reliable as possible.

With the means according to our invention such a detection is obtained, which utilizes the whole modulation effect in the pulse train (low-frequency component+side-band components).

A further advantage of the means according to our invention is that it may be used as a pulse generator which converts a direct or low frequency voltage to constant or amplitude modulated pulses without loss of power.

The invention will be described more closely with reference to the accompanying drawings, of which:

Figure 1:
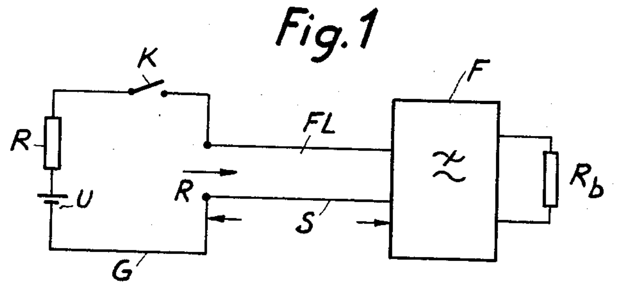
Fig. 1 shows a circuit diagram for a detector according to the invention.

In Fig. 1 a detector according to the invention is shown, comprising a line F1 and a low pass filter F, which are connected between a pulse generator G and a load $R_b$. The pulse generator may in most cases be represented by a source of voltage U with an inner resistance R and a switch K, which is with the pulse repetition frequency $f$ closed a time equal to the pulse time $\tau$. The generator is supposed to emit unmodulated pulses since it is from a principal point of view not necessary to calculate with the modulation, but it is sufficient to study the direct current. Said generator has during the pulse time $\tau$ (when the switch K is closed) an available power, i. e. a power which can be delivered to a load, matched to the generator:

$$P=\frac{U^2}{4R}$$

The average power is $pP$, where $$p=\frac{\tau}{T}$$

is the pulse ratio. The detector must completely transform said energy into direct current in the load $R_b$.

The line F1 is as nearly as possible a homogeneous line free from losses and has a length $s$ and a characteristic impedance R (=the inner impedance of the generator). The load $R_b$ is equal to the image impedance of the filter F in the pass band. The length $s$ of the line is so chosen, that the delay time is equal to half the pulse time $\tau$, and the cut off frequency of the low pass filter F is somewhat lower than half the pulse repetition frequency $f$. Further, the filter impedance in the suppress band at the terminals connected to the line is much greater than the characteristic impedance R of the line.

With the above mentioned properties of the detecting means such requirements are met, as can be put on a detector free from losses, namely:

1. In order to obtain all the available power from the pulse generator the detector must have a real and frequency independent inner impedance R equal to the inner impedance of the generator at least during the pulse time and over a frequency range, covering the pulse spectrum.

2. The detector may not comprise energy absorbing elements.

3. The detector must act as a low pass filter, so that only D. C. or low frequency components are allowed to pass up to the load, but not the pulse frequency and its harmonics.

The process at periodical closing of the switch K is the following if the detector circuit is assumed to be unexcited from the beginning: When the switch K is closed the generator seems at a first moment to be loaded with the characteristic impedance R of the line. Thus, a voltage step ½U travelling out along the line will arise at the input terminals of the line F1 and be reflected against the higher impedance of the filter back towards the generator whilst the voltage is doubled. The step returns after a time equal to the transit time forwards and backwards on the line, which is the pulse time $\tau$, i. e. right when the switch opens. The line F1 has then been charged to a D. C. voltage $2\frac{1}{2}U=U$, which is the E. M. F. of the pulse generator.

If the inductance and the capacitance of the line per unit of length is indicated by $l$ and $c$, respectively, the characteristic-impedance $$R=\sqrt{\frac{l}{c}}$$

and the wave velocity $$v=\frac{1}{\sqrt{lc}}$$

The following expression of the total capacitance of the line is obtained therefrom:

$$C=\frac{\frac{1}{2}\tau}{R}$$

when the delay time of the line is $$\frac{s}{v}=\frac{1}{2}\tau$$

The electrostatic energy of the line thereby becomes $$W_C=\tfrac{1}{2}CU^2=\frac{\tau U^2}{4R}$$

On the other hand a resistance R has loaded the generator during the time $\tau$ and an energy $$W_R=\frac{\tau U^2}{4R}=W_C$$

has thus been fed to the line. Thus, the whole available pulse energy has been stored on the line.

Seen from the point of view of the low-pass filter the pulse appears during a very short moment, so that the line may therefrom be considered as a condenser having the capacitance $$C=\frac{\frac{1}{2}\tau}{R}$$

which is suddenly charged to the voltage U. This voltage step travels through the filter and arrives as a constant direct voltage over the load resistance $R_b$. This is necessary, since the pulse repetition frequency and its harmonics are suppressed by the low-pass filter and except for the modulation there are no other A. C. components.

In order to allow the line to be completely unloaded between two pulses the current through the load resistance must be $$I_b=\frac{CU}{T}=p\cdot\frac{U}{2R}$$

and the power developed in the load resistance is $$P_b=R_bI_b^2=\frac{R_b}{R}p^2\frac{U^2}{4R}$$

If this power is considered to be equal to the average power $$p\frac{U^2}{4R}$$

delivered by the generator we obtain $$R_b=\frac{1}{p}R$$

and the voltage across the load will be $$U_b=R_bI_b=\frac{U}{2}$$

Thus, if the chosen load resistance is $$R_b=\frac{R}{p}$$

the line F1 is exactly discharged when the next pulse appears and the whole power taken out from the generator is thus consumed in the load resistance $R_b$, since there is no other energy-consuming element in the purely reactive detecting network. If the load resistance (and the image impedance of the filter) is chosen greater than $R/p$ the current will be smaller than $$p\frac{U}{2R}$$

and the line will not be discharged between the pulses, whereas if it is chosen smaller than $R/p$ the current will be greater than $$p\frac{U}{2R}$$

and the voltage on the line will swing over to the opposite polarity.

At the discharging of the line the following process usually takes place. As the low-pass filter F should have a high impedance in the suppress-band at the terminals turned towards the line, the termination section at this terminal must be a $\pi$—link. The low-pass filter F may for example consist of two constant $k$-links. In the shunt capacitance closest to the line is also comprised the capacitance of the line. Said shunt capacitance is suddenly loaded to the voltage U and is nearly aperiodically discharged through the first link, which forms a resonance circuit with the resonance frequency equal to the cut off frequency of the low-pass filter and loaded by the other sections of the filter. The thus smoothed voltage is further smoothed in the other link so that the voltage across the load is a nearly constant direct voltage across the load is a nearly constant direct voltage.

Supposing that the "peak-power" of the pulse train is P, a pulse amplitude may be defined as $A=\sqrt{P}$. The average value of the amplitude A, i. e. the D. C. component of the pulse train, will then be $p\cdot A$. When modulated said component varies as $p\cdot A(1+m\sin 2\pi f_m t)$, where $m$ is the modulation factor and $f_m$ the modulation frequency, and the low-frequency power will thus be $\frac{1}{2}m^2p^2A^2$. If on the other hand, the whole pulse power, which has an average value of $pA^2$, is taken out, a direct current $\sqrt{p\cdot A}$ is obtained after detection, which will give a low-frequency effect $\frac{1}{2}m^2pA^2$ when modulated. Supposing for instance that the pulse-time $\tau$ is 0.5 $\mu$s. and the pulse-repetition period T is 125 $\mu$s. (the pulse repetition frequency 8000 P./S.), an improvement of the attenuation being as much as 24 db is obtained in the ideal case by a detection circuit according to the invention.

Figure 2:
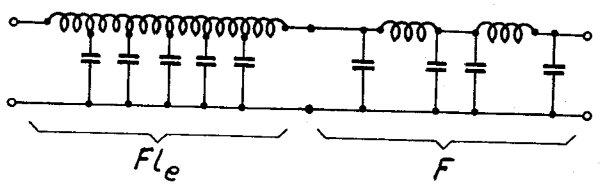
Figs. 2, 3 and 4 show connection diagrams for different embodiments of the means according to the invention.

The length of the line becomes considerable and if the wave velocity is equal to the light velocity and the pulse time is for example 0.5 $\mu$s., the length of the line will be 75 m. The real line may however be replaced by an artificial line as shown in Fig. 2, where $F1_e$ is an artificial line which may consist of a delay line or a network of series inductances and shunt-capacitances.

Figure 3:
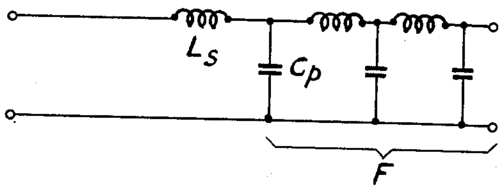
Figure 4:
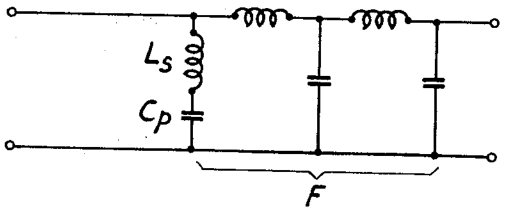

It is proved that an excellent result can be obtained if the line is quite simply replaced by an inductance in series with the shunt-condenser of the low-pass filter lying nearest to the switch in the manner shown in Figs. 3 and 4, where $L_s$ is a series inductance and $C_p$ a shunt capacitance. $L_p$ and $C_s$ are approximately determined by the equation $$\tau=\pi\sqrt{L_sC_p}$$

$\tau$ being the pulse time as before.

Figure 5:
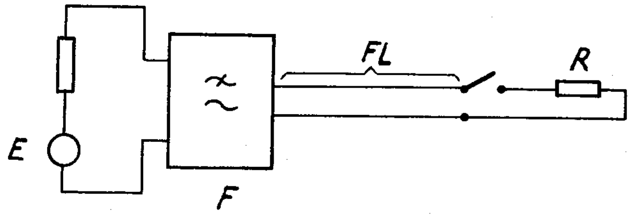
Fig. 5 shows a circuit diagram for a pulse generator according to the invention.

It has proved possible to drive the above described detector-connections in the opposite direction, that is to use them together with a switch as a pulse-generator, which without power losses transforms a direct or low-frequency voltage to respectively constant and amplitude modulated pulses as is shown in Fig. 5. In this figure E is a source of direct or low frequency voltage, F is a low-pass filter, F1 a homogeneous low-loss line and K is a switch. When the switch is open the line F1 is fed from the source of voltage E and charged to its crest value, and when the switch is broken the line is discharged in a well-defined pulse over a load which may for example consist of a detector-circuit as described above.

Figure 6:
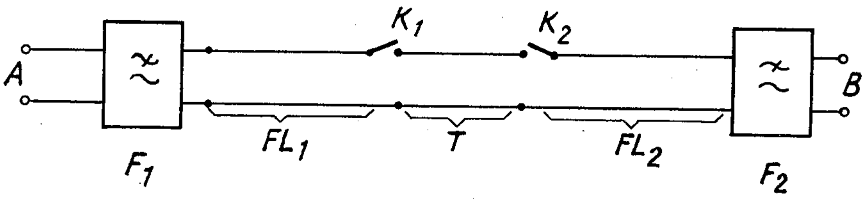
Fig. 6 shows a pulse transmission system.

An interesting application is a pulse transmission system consisting of a generator and a detector according to the preceding. The principle of such a system is shown in Fig. 6. T is here a mechanically long but electrically short transmission line, which can be used in common for several communications. $F1_1$ and $F1_2$ are the real or the artificial lines pertaining to the respective circuits, and $F_1$ and $F_2$ are the corresponding low-pass filters. The switches $K_1$ and $K_2$ are synchronically closed. With this system a physical connection between A and B is obtained in both directions with a frequency band up to the half closing frequency of the switches the transmission takes place with a minimal attenuation and with the electronic switches (rectifiers a. s. o.) available today it is possible to reduce the attenuation to only 1 to 2 db, in spite of the transmission line common to several communications being used only a fraction of the whole time for a certain communication.

We claim:

1. In a detector system for detecting modulated and unmodulated pulses having constant repetition frequency and phase and being received from a pulse source, in combination an approximately dissipationless and distortion-free delay line having a delay time substantially equal to one half the pulse width, a source of pulses, one end of said delay line being connected to said pulse source, the impedance of said pulse source being substantially equal to the characteristic impedance of the delay line during the pulse time but differs considerably from said characteristic impedance during the time between the pulses, and low-pass filter means having a cutoff-frequency less than half the pulse repetition frequency, the other end of said delay line being connected to said terminals of filter means.

2. A detector system as claimed in claim 1, wherein the image impedance at the respective terminals of the low-pass filter means turned towards the delay line, is equal to the ratio between the characteristic impedance of the delay line and the ratio between the pulse duration and the pulse repetition period.

3. A detector system as claimed in claim 1, wherein the cutoff-frequency of the low-pass filter means is between one half the pulse repetition frequency and the highest desired modulation frequency.

4. A detector system as claimed in claim 1, wherein the low-pass filter means is image impedance matched to a load impedance at its terminals other than those connected to the delay line.

5. A detector system as claimed in claim 1, wherein the image impedance of the low-pass filter means is high in relation to the characteristic impedance of the delay line.

6. A detector system as claimed in claim 1, wherein the low-pass filter means comprises a shunt capacitance next to the terminals of the filter means turned towards the delay line, the capacitance of the delay line being a part of said shunt capacitance.

7. A detector system as claimed in claim 1, wherein the low-pass filter means comprises a shunt capacitance next to the terminals of the filter means turned towards the delay line, the capacitance of the delay line being a part of said shunt capacitance.

8. A detector system as claimed in claim 7, wherein the said delay line further comprises an inductance in series with said shunt capacitance.

9. A detector as claimed in claim 8, wherein said inductance and said capacitance form a resonance circuit having a resonance frequency equal to the inverse value of twice the pulse time.

10. A detector system as claimed in claim 1, wherein the delay line includes a number of cascaded L-links, each of said links comprising a series inductance and a shunt capacitance.

References Cited in the file of this patent

UNITED STATES PATENTS

| | | |
|---|---|---|
| 2,420,302 | Darlington | May 13, 1947 |
| 2,420,309 | Goodall | May 13, 1947 |

FOREIGN PATENTS

| | | |
|---|---|---|
| 122,861 | Australia | Nov. 20, 1946 |